(12) United States Patent
Ishiyama et al.

(10) Patent No.: US 8,345,096 B2
(45) Date of Patent: Jan. 1, 2013

(54) SENSOR AND APPARATUS FOR VEHICLE HEIGHT MEASUREMENT

(75) Inventors: Yutaka Ishiyama, Tokyo (JP); Takuya Kushimoto, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 410 days.

(21) Appl. No.: 12/437,038

(22) Filed: May 7, 2009

(65) Prior Publication Data

US 2009/0278927 A1 Nov. 12, 2009

(30) Foreign Application Priority Data

May 7, 2008 (JP) ................................ 2008-121306

(51) Int. Cl.
*H04N 7/18* (2006.01)
*G06K 9/00* (2006.01)
*G01C 3/00* (2006.01)

(52) U.S. Cl. ........ 348/139; 382/106; 382/103; 356/3.14
(58) Field of Classification Search ........................ None
See application file for complete search history.

(56) References Cited

U.S. PATENT DOCUMENTS

| | | | | |
|---|---|---|---|---|
| 5,535,522 | A * | 7/1996 | Jackson | 33/288 |
| 6,690,451 | B1 * | 2/2004 | Schubert | 356/3.14 |
| 6,965,438 | B2 * | 11/2005 | Lee et al. | 356/625 |
| 7,184,088 | B1 * | 2/2007 | Ball | 348/348 |
| 7,454,841 | B2 * | 11/2008 | Burns et al. | 33/288 |
| 2008/0114518 | A1 * | 5/2008 | Leleve | 701/49 |
| 2009/0114485 | A1 * | 5/2009 | Eggert | 187/394 |

FOREIGN PATENT DOCUMENTS

JP 01-097805 A 4/1989

* cited by examiner

*Primary Examiner* — Wen-Tai Lin
(74) *Attorney, Agent, or Firm* — Kenealy Vaidya LLP

(57) ABSTRACT

The disclosed subject matter relates to a sensor and apparatus for vehicle height and slant measurement which can include a light source, and two cameras with respective lenses. The light source can be configured to emit light towards a road, and both cameras can be configured to receive the image of the road that is illuminated by the light from the light source and to thereby create image data. The apparatus can include a control circuit that can geometrically measure a vehicle height in accordance with the image data. The sensor can also receive image data from different points and from two light sources, and the apparatus can detect a vehicular lean using the different vehicle heights. Thus, because the sensors of the disclosed subject matter do not necessarily include a moving part as in the conventional sensor, the sensors can be easily attached to a vehicle body and can also be used for a vehicular lean detection.

20 Claims, 10 Drawing Sheets

SENSOR AND APPARATUS FOR VEHICLE HEIGHT MEASUREMENT

This application claims the priority benefit under 35 U.S.C. §119 of Japanese Patent Application No. 2008-121306 filed on May 7, 2008, which is hereby incorporated in its entirety by reference.

BACKGROUND

1. Field

The presently disclosed subject matter relates to a sensor for vehicle height measurement, and an apparatus for vehicle height measurement. The sensor and apparatus can be used whenever not only vehicle height but also a slant of a vehicle can be measured. The disclosed subject matter is particularly suitable for use in a headlight system including a leveling device.

2. Description of the Related Art

When a rear-wheel drive vehicle starts moving and when a vehicle having a heavy load in a trunk thereof drives, the front of the vehicle may lean slightly upwards in a direction opposite to a road. Therefore, the headlight of the vehicle may cause glare to an oncoming car because the vehicle headlight emits an upward light.

In order to prevent a vehicle headlight from causing glare, the vehicle can be configured to prevent the headlight thereof from inclining upwards from a road. To that end, the vehicle can include a leveling device to keep the headlight thereof in a horizontal position and the leveling device can include at least two vehicle height sensors to detect a lean of the vehicle. One reason for using two sensors is so that the vehicular slant can be detected by providing both a front and a rear portion of the body of the vehicle with a respective vehicle height sensor, and calculating a difference between the front and rear heights of the vehicle.

A conventional vehicle height sensor is disclosed, for example, in patent document No. 1 (Japanese Patent Application Laid Open H01-097805). FIG. 10 is an explicative diagram explaining a basic structure in the conventional vehicle height sensor that is disclosed in patent document No. 1.

The vehicle height sensor 90 includes: a light source 91 that is composed of an LED lamp 91a and a lens 91b for emitting parallel light from the light emitted from the LED lamp 91a; a shutter 92 having a slit 92 through which the parallel light passes; a light detector 93 converting the parallel light into two electrical current signals that can be divided in inverse proportion to distances from both edges 93a and 93b; and a control circuit 94 including I-V converters (current to voltage) 94a and 94b, a subtractor 94c and an adder 94d.

Both the light source 91 and the light detector 93 are attached to a vehicular body and the shutter 92 is attached to a member that supports vehicular wheels. Therefore, while the vehicular body moves up and down, both the light source 91 and the light detector 93 also move up and down with respect to the shutter 92 which has the slit 92a.

In this case, while both the light source 91 and the light detector 93 move up and down, the above-described two currents change and the converted voltages are output via the respective I-V converters 94a and 94b. However, when the light detector 93 receives the parallel light emitted from the light source 91, the total current of the two currents may not substantially change. Thus, while an output of the adder 94d is same, the vehicle height can be detected by measuring an output of the subtractor 94 that outputs a difference between the two converted voltages.

When a vehicular lean is detected by the vehicle height sensor 94, the two vehicle height sensors 94 are attached to a front body and a front-wheel member and a rear body and a rear-wheel member, respectively. The vehicular lean can be detected by calculating a difference between the front and rear vehicle heights output from the respective vehicle height sensors 94.

The above-referenced Patent Document is listed below and is hereby incorporated with its English abstract in its entirety.
1. Patent document No. 1: Japanese Patent Application Laid Open H01-097805

According to the above-described vehicle height sensor 90, both the light source 91 and the light detector 93 need to be attached to a vehicle body, and the shutter 92 needs to be attached to a member for supporting vehicular wheels, for example, a shock absorber, a suspension, etc. The attached member may be subject to shock from road surface variation and may be exposed to rainwater, mud, etc. Thus, it may be difficult for the vehicle height sensor 90 to include the shutter 92 attached to the member and may also be difficult to maintain a normal measuring state for measuring a vehicle height with accuracy.

In addition, the vehicle height sensor 90 may need to have a position adjusted between both the light source 91 and the light detector 93 and the shutter 92 in order to measure a vehicle height with accuracy. The adjustment may be difficult for workers to accomplish in view of the mounting location of the vehicle height sensor 90 and so on. Furthermore, it may be difficult for the sensor 90 to detect a long range of a vehicle height due to a restriction of the light detector 93 in size, and therefore it may be difficult to employ the same sensor for various vehicles.

The presently disclosed subject matter has been devised to consider the above and other problems, features and characteristics. Thus, according to an aspect of the disclosed subject matter, an embodiment of the disclosed subject matter can include a sensor for vehicle height measurement. The sensor can be employed for various vehicles from a small car to a big truck and also can be easily attached to a vehicle body because the sensor does not necessarily include a moving part. According to another aspect of the disclosed subject matter, an apparatus for vehicle height measurement can be configured to use the above-described sensor. The vehicle height measurement apparatus can measure not only vehicle height but also vehicular slant and can also be easily attached to a vehicle body along with the sensor. The vehicle height measurement apparatus can have practical uses related to a headlight system including a leveling device and the like.

SUMMARY

The presently disclosed subject matter has been devised in view of the above described characteristics, problems and the like. An aspect of the disclosed subject matter includes a sensor for vehicle height measurement, wherein a linear light can be emitted towards a road and a vehicle height can be measured by photographing the image on the road using two line cameras. Thus, the sensor of the disclosed subject matter does not necessarily require an adjustment at the attachment thereof and the device can be easily attached to a vehicle body. The device is not necessarily attached to a moving member and does not necessarily include a moving part, such as the conventional sensor.

In a variation of the sensor for vehicle height measurement of the disclosed subject matter, vehicular lean can be detected using two linear light sources incorporated into the sensor.

Thus, the sensor of the disclosed subject matter can result in detecting vehicular lean with a simple structure without using two vehicle height sensors.

Another aspect of the disclosed subject matter includes an apparatus for vehicle height measurement using the above-described sensors. The vehicle height measurement apparatus can measure not only vehicle height but also vehicular slant with a simple configuration. Thus, the apparatus can be incorporated into various devices that are controlled by detecting vehicle height and vehicular slant, for example, a headlight system including a leveling device and so on.

According to an aspect of the disclosed subject matter, a sensor for vehicle height measurement can include: a base board; a linear light source attached to the base board and configured to emit a linear light towards a road; a first line camera attached to the base board so that a length direction thereof can be located substantially perpendicular to a length direction of the linear light; a second line camera attached to the base board opposite the first line camera so that a length direction thereof can be located substantially on a virtual extension line in the length direction of the first line camera; and a pair of lenses having a focus and a focal length located in front of the first line camera and the second line camera, so that both a virtual line connecting the focuses thereof and a virtual line connecting the focal lengths thereof and the virtual extension line connecting the first and the second line cameras can be located substantially in parallel on a same virtual surface.

According to another of the aspects of the disclosed subject matter, a sensor for vehicle height measurement can include: a base board; a first linear light source attached to the base board and configured to emit a linear light towards a road; and a second linear light source attached to a base board substantially in parallel with the first light source so as to emit a linear light substantially in parallel with the linear light of the first linear light source. With respect to the cameras and the lenses, these structures can be the same as or similar to the immediately above-described structures.

In the above-described exemplary embodiments of a sensor for vehicle height measurement, each of the linear light sources can be composed of a plurality of LED chips, and each of the length directions of the linear light sources can be located substantially perpendicular to a travelling direction of a vehicle or in the same travelling direction according to the usage.

According to another aspect of the disclosed subject matter, a vehicle height measurement apparatus using at least one sensor can include: a driver configured to drive a linear light source so as to emit linear light towards a road; a receiver configured to receive an image on the road that is generated by the linear light via both a first line camera and a second line camera as the image data; and a controller configured to control both the driver and the receiver, and configured to calculate a vehicle height in accordance with image data output from the receiver, a distance between the focuses of a pair of lenses and a focal length of the pair of lenses.

In the immediately above-described exemplary embodiment, because the apparatus can measure a vehicle height with geometrical-accuracy using an optical detection sensor that does not need a moving part to operate, the sensor can be easily attached to a vehicle body and the apparatus can also be used for various types of vehicles.

According to another exemplary embodiment of another aspect of the disclosed subject matter, a vehicle height measurement apparatus using the sensor described above can include: a driver configured to drive both linear light sources so as to emit both linear lights towards a road; a receiver configured to receive the respective images on the road that are generated by the linear lights via both a first line camera and a second line camera which provide the image data; and a controller configured to detect a vehicular lean in accordance with the respective image data output from a receiver.

Thus, the above-describe apparatus can geometrically detect a vehicular lean with a simple structure using the above-describe optical detection sensor. The sensor can be easily attached to a vehicle body as one integrated sensor for vehicular lean detection and therefore the apparatus using the sensor can be incorporated into various devices such as a headlight system including a leveling device, etc.

According to an additional exemplary embodiment of another aspect of the disclosed subject matter, a vehicle height measurement apparatus using a plurality of sensors can include: a driver configured to drive linear light sources located in the plurality of sensors so as to emit respective linear light rays towards a road; a receiver configured to receive the respective images on the road that are generated by the respective linear lights via both a corresponding first line camera and a corresponding second line camera in the plurality of sensors to provide the image data; and a controller configured to calculate the respective vehicle height values in accordance with the corresponding image data output from a receiver and the like located in the plurality of sensors, and configured to detect a vehicular slant between at least two vehicle height values.

In the above-described exemplary embodiments of an apparatus for vehicle height measurement, the controller can operate in accordance with an instruction output from, for example, a headlight system via an input thereof, and the controller can output the vehicle height value to, for example, the headlight system via an output thereof. Thus, the vehicle height measurement apparatus can be employed for various devices that are controlled by a vehicular slant because the apparatus can measure vehicular slant values in various directions of a vehicle with accuracy.

BRIEF DESCRIPTION OF THE DRAWINGS

The above and other characteristics and features of the disclosed subject matter will become clear from the following description with reference to the accompanying drawings, wherein.

DETAILED DESCRIPTION OF EXEMPLARY EMBODIMENTS

Figure 1:
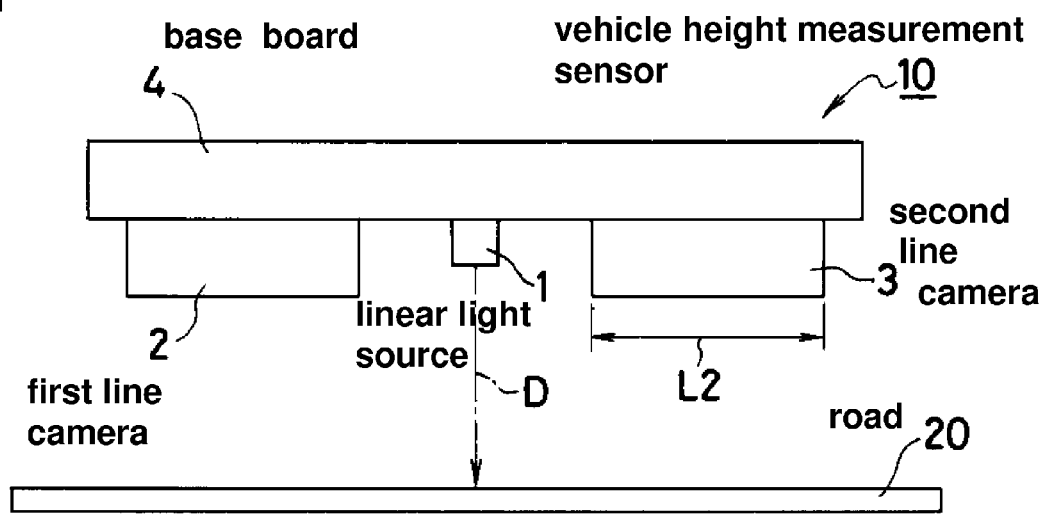
FIG. 1 is a front view of a first exemplary embodiment of a sensor for vehicle height measurement made in accordance with principles of the disclosed subject matter.
Figure 2:
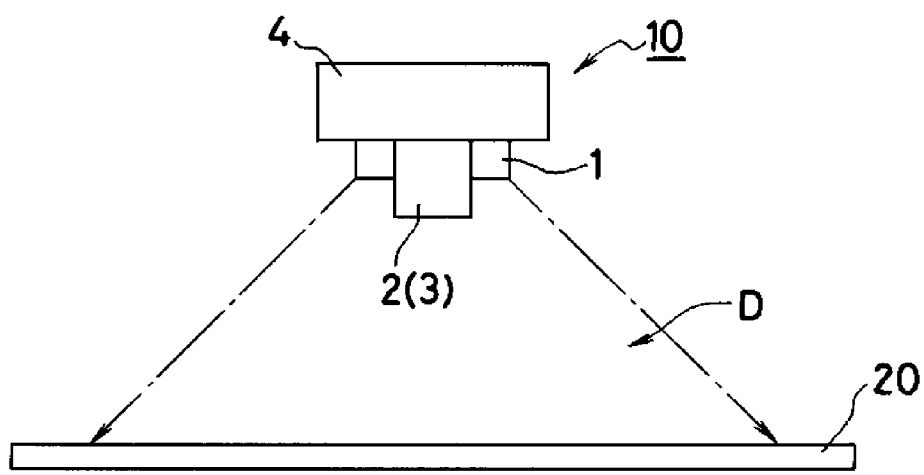
FIG. 2 is a side view of the sensor for vehicle height measurement of FIG. 1.
Figure 3:
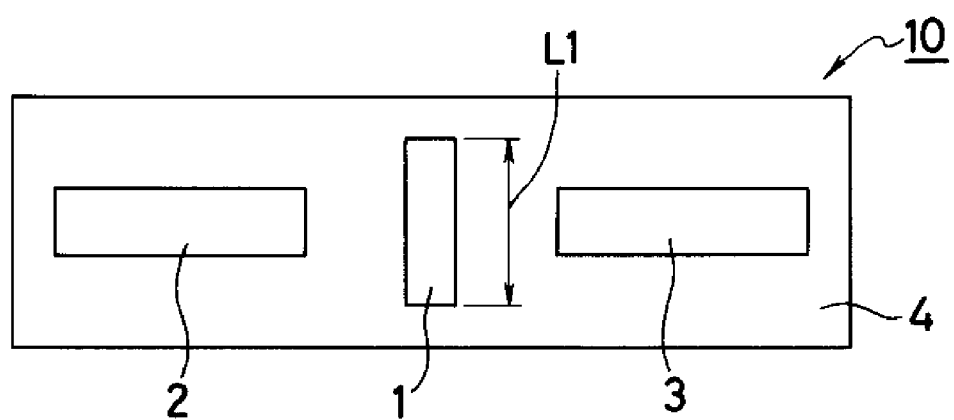
FIG. 3 is a bottom view of the sensor for vehicle height measurement of FIG. 1.

Exemplary embodiments of the disclosed subject matter will now be described in detail with reference to FIGS. 1-9 (B). FIGS. 1-3 are a front, side and bottom views of a first exemplary embodiment of a sensor for vehicle height measurement made in accordance with principles of the disclosed subject matter, respectively.

A vehicle height measurement sensor 10 can include: a base board 4; a linear light source 1 attached to the base board 4; a first line camera 2 attached to the base board 4; and a second line camera 3 attached to the base board 4 so that the linear light source 1 can be located between the first line camera 2 and the second line camera 3. In this case, both the first line camera 2 and the second line camera 3 can be located in alignment with respective length directions L2 thereof and a virtual substantially linear line containing both of the length direction lines can be located and oriented substantially perpendicular with respect to the linear light source 1 and the length direction L1 thereof. The length directions L2 can be defined by a substantially linear line that is substantially parallel with a longitudinal axis of each of the first line camera 2 and second line camera 3. The length direction L1 can likewise be defined by a substantially linear line that is substantially parallel with a longitudinal axis of the linear light source 1.

The linear light source 1 can be light-emitting means and can be composed of various light sources, for example, a bulb, a semiconductor light source such as an LED, etc. When an LED is used for the linear light source 1, the linear light source 1 can be constructed by aligning a plurality of LED chips on a circuit board. The linear light source 1 can emit a linear light toward a road 20 between the first line camera 2 and the second line camera 3 when a vehicle height needs to be measured by the vehicle height measurement sensor 10.

The first line camera 2 and the second line camera 3 can be imaging means and can be composed of semiconductor photo-chips such as CCD, CMOS and the like. The semiconductor photo-chips can be arranged in linear order in the first and second line cameras 2, 3 in order to photograph an image on a road that is generated by the linear light emitted from the linear light source 1 towards a road.

The base board 4 can be composed of a plastic, paper, ceramic, metal plate, and the like, and can include a control circuit mounted thereon as described in detail later. The base board 4 can also be used for attaching the vehicle height measurement sensor 10 to a vehicle body.

The sensor 10 can be attached to a vehicle body so that the length direction L1 of the linear light source 1 can correspond to a travelling direction of the vehicle. However, in the vehicle height measurement sensor 10 of the first exemplary embodiment, the attached direction is not limited to a travelling direction of a vehicle. For example, if both linear cameras 2, 3 can photograph the image on a road, the length direction L1 of the linear light source 1 does not necessarily have to be aligned with the travelling direction of the vehicle.

In the structure of the vehicle height measurement sensor 10 shown in FIGS. 1-3, both line cameras 2, 3 may not photograph the image on a road that is generated by the linear light emitted from the linear light source 1 because the photographing area is narrow. Therefore, both line cameras 2, 3 can be outfitted with respective lenses such as a concave lens such that the photographing area can be expanded. Similarly, the linear light source 1 may include a lens such as a collecting lens in order for both line cameras 2, 3 to easily photograph the image on a road depending on the kind of vehicle.

Figure 4:
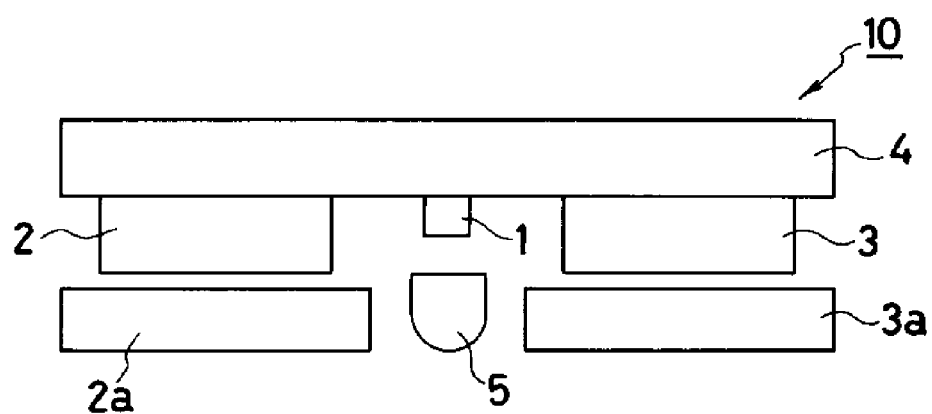
FIG. 4 is a front view showing a location of lenses in the sensor for vehicle height measurement of FIG. 1.
Figure 5:
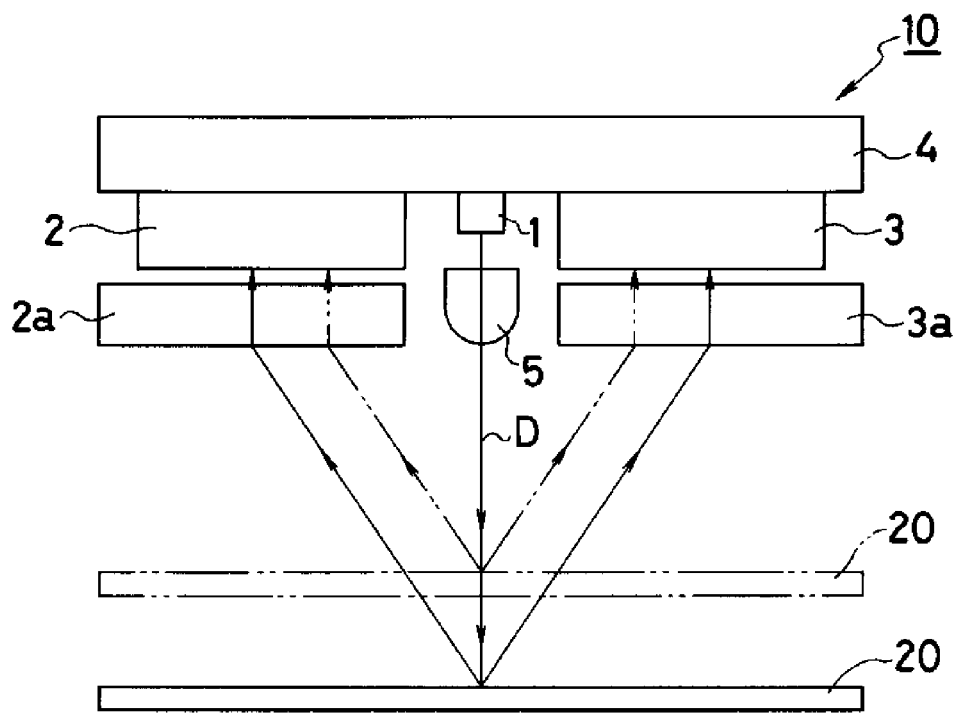
FIG. 5 is an explicative diagram showing a method for vehicle height measurement in accordance with the disclosed subject matter.

FIG. 4 is a front view showing a location of lenses in the sensor for vehicle height measurement of FIG. 1. FIG. 5 is an explicative diagram showing an exemplary method for vehicle height measurement in accordance with the disclosed subject matter. The photographing areas of line cameras 2, 3 can be expanded by locating lenses 2a and 3a in front of the respective line cameras 2, 3.

In this case, both a virtual line that connects a focus (hereinafter referred to as "center") of the lens 2a to a center of the lens 3a and a virtual line connecting the focal lengths thereof should be located substantially in parallel on a same virtual surface along with the virtual line between the first line camera 2 and the second line camera 3 as described in detail later.

The image on a road that is formed by the linear light source 1 can be clearly show by locating a lens 5 in front of the linear light source 1. Thus, both line cameras 2, 3 can easily photograph the road image that is generated by the light emitted from the linear light source 1 located between both line cameras 2, 3.

In this case, the higher a vehicle height is, the farther a distance is between the image data received by both line cameras 2, 3. This is due to a change of distance between the lenses 2a, 3a and the road 20, as shown in FIG. 5. Thus, a vehicle height can be measured by detecting the distance between the image data received by both line cameras 2, 3.

Figure 6:
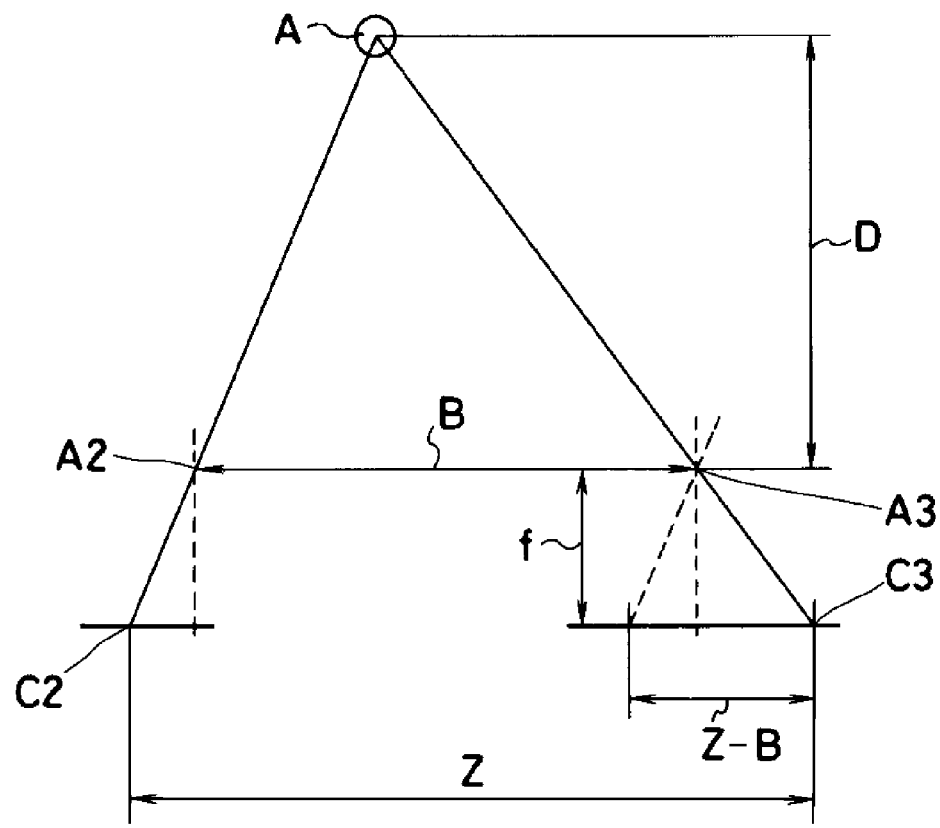
FIG. 6 is an explicative diagram showing a method for distance measurement in accordance with the disclosed subject matter.

An exemplary specific method for vehicle height measurement will now be given in detail with reference to FIG. 6. The road image that is generated by the linear light emitted from the linear light source 1 is defined as A, and both centers of lenses 2a, 3a having focal length of f are defined as C2 and C3, respectively. In addition, the distance between the both centers C2 and C3 is defined as Z.

In this case, because the image A that is directed at the center C2 of the lens 2a having focal length of f is directed at point A2 toward the line camera 2, the line camera 2 can photograph the image A virtually at point A2 thereon. Similarly the line camera 3 can photograph the image A virtually at point A3 thereon because the image A that is directed at the center C3 of the lens 3a having focal length of f is directed at point A3 toward the line camera 3.

The virtual line C2-C3 can be located and oriented substantially parallel with both line cameras 2, 3, and therefore two triangles (A, A2, A3) and (A, C2, C3) that are formed by the above-described image data can be homothetic (or can include two walls that can be completely superimposed onto or into each other). Thus, a relational formula of [D:B=f:(Z−B)] can come into existence. In this case, D can be a distance between the road (A) and the focal length (f) of the lenses 2a, 3a, that is to say, can be a vehicle height that should be measured by the vehicle height sensor 10.

Thus, a vehicle height D can be measured by detecting the distance B between the image data received by both line cameras 2, 3 as described above. In this case, because (Z−B) is equal to a total of a distance between the center C2 and a point on the virtual line C2-C3 that is intersected at right angle with a line of point A2 and a distance between the center C3 and a point on the virtual line C2-C3 that is intersected at right angle with a line of point A3, (Z−B) can be replaced with the total of the above-described distances.

When the vehicle height measurement sensor 10 is attached to a place on a vehicle body from which a distance from a road surface can be viewed, the distance between the vehicle body and the road can be measured. In addition, because the vehicle height measurement sensor 10 does not necessarily require adjustment during the attachment thereof, and also does not need to be attached to a moving place on the vehicle, such as in the conventional vehicle height sensor, the sensor 10 of the disclosed subject matter can be easily attached to a vehicle body.

Moreover, when a plurality of sensors 10 are attached to both front body and rear body, the backward and forward slant can be detected by calculating a difference between the two vehicle location heights. The leftward and rightward slant can also be detected by calculating a difference between the two vehicle location heights when the sensors 10 are attached to both a left-side of the vehicle body and a right-side of the vehicle body. Furthermore, both the backward and forward slant and the leftward and rightward slant can be detected when three sensors 10 are provided.

Figure 7:
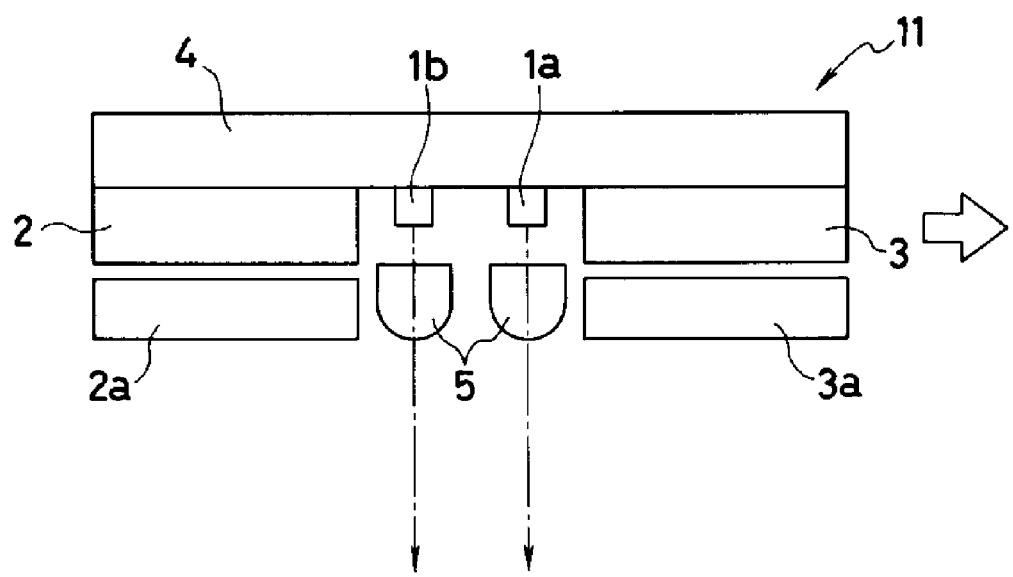
FIG. 7 is a front view showing a second exemplary embodiment of a sensor for vehicle height measurement made in accordance with principles of the disclosed subject matter.

When a vehicular lean is intended to be detected by the vehicle height measurement apparatus as described above, at least two sensors 10 are used. A sensor for detecting a vehicular lean using one integrated sensor will now be described in detail with reference to FIGS. 7-8. FIG. 7 is a front view showing a basic structure of the sensor for vehicle height measurement in accordance with a second exemplary embodiment of the disclosed subject matter.

A difference between the first exemplary embodiment and the second exemplary embodiment is that the second exemplary embodiment can include two linear light sources 1a, 1b in the vehicle height sensor 11 of the second exemplary embodiment. The linear light sources 1a and 1b can be parallel to each other and can be located substantially perpendicular to the virtual line of the length directions of the both line cameras 2, 3 (i.e., a longitudinal axis of each of the light sources 1a and 1b can be perpendicular to a longitudinal axis of each of the cameras 2, 3).

Figure 8:
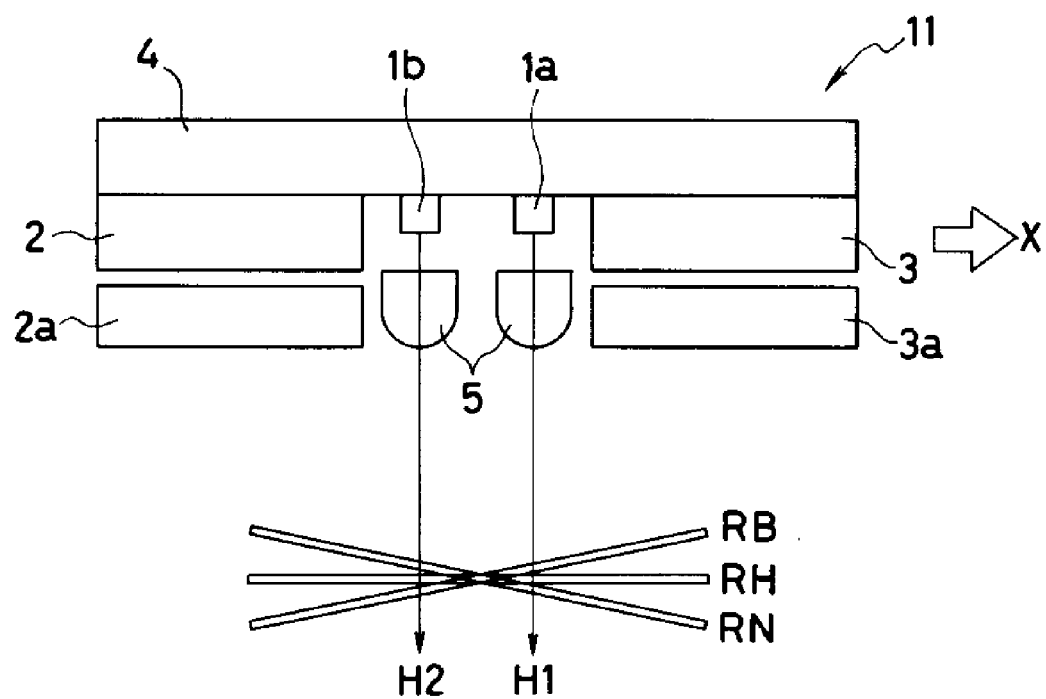
FIG. 8 is an explicative diagram explaining an operation of the sensor for vehicle height measurement of FIG. 7.

FIG. 8 is an explicative diagram explaining an operation of the sensor for vehicle height measurement of FIG. 7. When the virtual line of the length directions of the both line cameras 2, 3 substantially corresponds to a travelling direction X of a vehicle (i.e., when the longitudinal axis of each the cameras is substantially parallel with a longitudinal axis of the vehicle), the vehicle height measurement sensor 11 can detect a lean in the backward and frontward direction of the vehicle.

In FIG. 8, a vehicle height that is measured by light emitted from the linear light source 1a is shown as H1, and a vehicle height that is measured by light emitted from the linear light source 1b is marked as H2. In this case, the vehicle heights H1, H2 can be measured by two light rays emitted from the linear light sources 1a, 1b, respectively, at the same time, and can be measured at slightly different times, respectively.

A slant of the vehicle can be detected by determining a difference between the vehicle heights H1 and H2. For instance, when the vehicle height H1 is equal to the vehicle height H2, the vehicle body can be determined to be oriented in a horizontal position (RH). When the vehicle height H1 is shorter than the vehicle height H2, the front of the vehicle body can be determined to be in an upward direction (RB), and when the vehicle height H1 is longer than the vehicle height H2, the front of the vehicle body can be determined to be in a downward direction.

Thus, in the vehicle height measurement sensor 11 of the second exemplary embodiment, a slant of vehicle body can be detected by comparing the vehicle height H1 that is measured by the light emitted from the linear light source 1a with the vehicle height H2 that is measured by the light emitted from the linear light source 1b. In this case, when the distance B between the point A2 imaged on the first line camera 2 and the point A3 imaged on the second line camera 3 is long, the vehicle height is high. On the contrary, when the distance B between the point A2 imaged on the first line camera 2 and the point A3 imaged on the second line camera 3 is short, the vehicle height is low.

When the slant of vehicle body is detected by the vehicle height sensor 11, the slant direction of a vehicle body can be detected by comparing the distance B that is measured using the light emitted from the first linear light source 1a with the distance B that is measured using the light emitted from the first linear light source 1b in place of the vehicle heights H1 and H2. Thus, according to the second exemplary embodiment, a slant of vehicle body can be compactly detected by the sensor 11 that is integrated as one piece sensor.

Figure 9A:
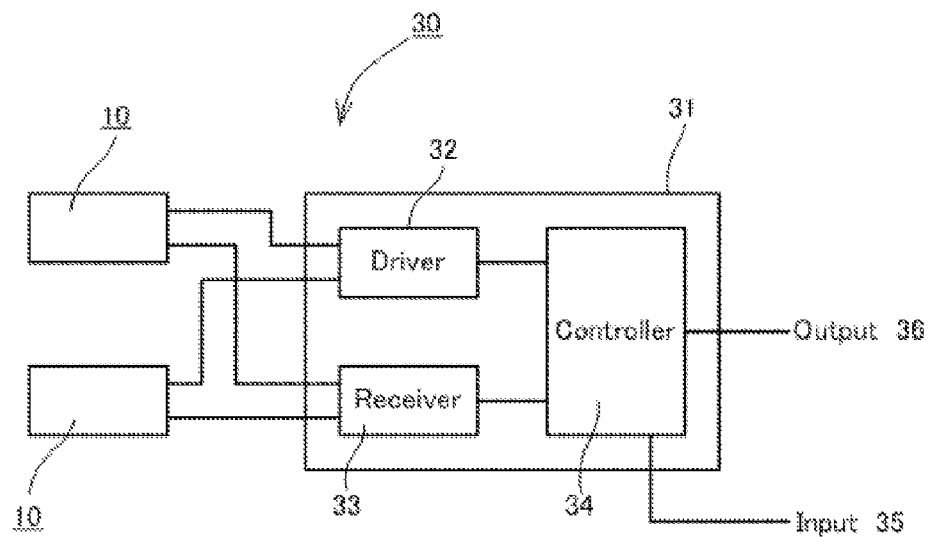
FIGS. 9(A) and (B) are explicative block diagrams of apparatuses for vehicle height measurement using the sensors of the first exemplary embodiment and the second exemplary embodiment, respectively.

Apparatuses for vehicle height measurement using the above-described sensors will now be described in detail with reference to FIGS. 9(A) and (B). FIG. 9(A) is an explicative block diagram of an apparatus for vehicle height measurement using the sensor of the first exemplary embodiment. The apparatus for vehicle height measurement 30 can include at least one vehicle sensor 10 and the control circuit 31.

The control circuit 31 can include: a driver 32 for driving the linear light source 1; a receiver 33 for receiving image data output from both the first line camera 2 and the second line camera 3; and a controller 34 for controlling both the driver 32 and the receiver 33 and for carrying out an operation, etc.

When a vehicle height is measured by the apparatus for vehicle height measurement 30, a linear light can be emitted from the linear light source 1 by the driver 32, and the receiver 33 can receive image data of a road that is generated by the linear light and both the first line camera 2 and the second line camera 3. The controller 34 can calculate a vehicle height in accordance with the image data output from the receiver 33 and a distance between the focuses of the pair of lenses 2a, 3b and the focal length of the pair of lenses 2a, 3b using the above-described method for distance measurement.

In this case, the controller 34 can receive an instruction of the measurement via an input 35 and can output the data to a device via an output 36. Therefore, various devices can input the data from the controller 34 via the output 36 and can output the instruction for the measurement to the controller 34 via the input 35.

When a vehicular slant for a leveling device of a headlight system is measured using two vehicle height sensors 10, the vehicle height sensors 10 can be attached to front portion and rear portion of the vehicle body, respectively. A light can be emitted from either one of the linear light sources 1 of the two sensors 10 by the driver 32 and the receiver 33 can receive the image data from the first and second line cameras 2, 3 in the sensor 10. Then, a light can be emitted from the other one of the linear light sources 1 of the two sensors 10 by the driver 32 and the receiver 33 can receive the image data from the first and second line cameras 2, 3 in the sensor 10.

The controller 34 can calculate the front and rear vehicle heights from the image data in accordance with the above-described method for distance measurement and can compare the front vehicle height with the rear vehicle height. Then, the controller 34 can output the data of the vehicular slant via an output 36. In this case, the controller 34 can receive an instruction of the measurement from the leveling device via the input 35 and can output the data of the vehicular slant to the leveling device via the output 36.

Figure 9B:
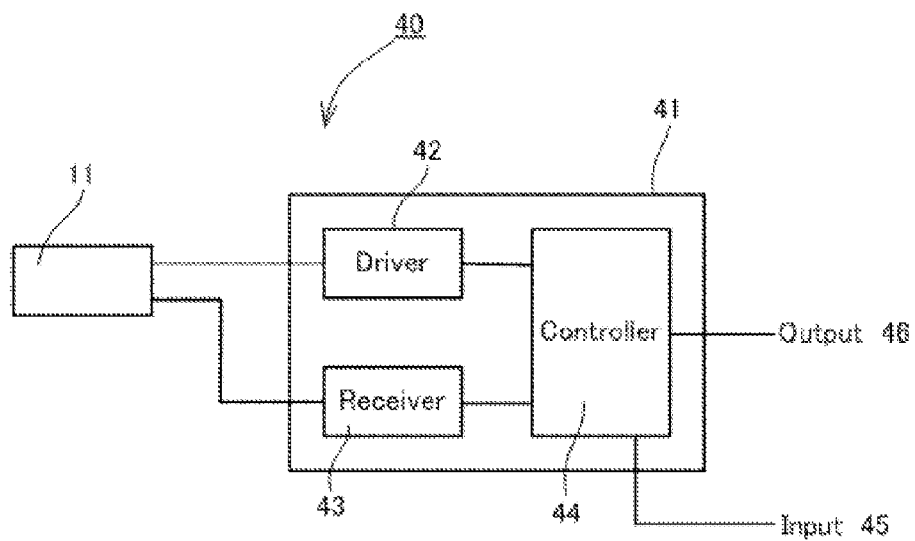
Figure 10:
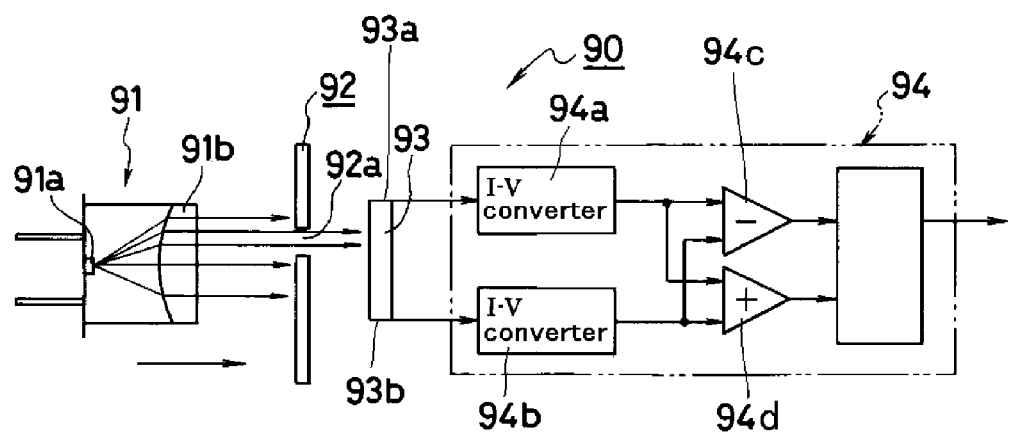
FIG. 10 is an explicative diagram explaining a basic structure in a conventional vehicle height sensor.

FIG. 9(B) is an explicative block diagram of an apparatus for vehicle height measurement using the sensor 11 of the second exemplary embodiment. The apparatus for vehicle height measurement 40 can include the vehicle height measurement sensor 11 and the control circuit 41. The apparatus 40 can measure not only a vehicle height but also a vehicular slant at the same time using the sensor 11.

When a vehicle height is measured by the apparatus for vehicle height measurement 40, a linear light can be emitted from either one of the linear light sources 1a, 1b in the sensor 11 by the driver 42, and the receiver 43 can receive the image data from the first and second line cameras 2, 3 located in the sensor 11. The controller 44 can calculate the vehicle height from the image data in accordance with the above-described method for distance measurement and can output the data via an output 46. In this case, the controller 44 can receive an instruction of the measurement via an input 45.

When a vehicular lean for a leveling device of a headlight system is detected using the apparatus 40, the vehicle height measurement sensor 11 can be attached to a vehicle body so that the length direction of the both linear light sources 1a, 1b in the sensor 11 can be located substantially perpendicular to a travelling direction of a vehicle (i.e., the longitudinal axis of each of the light sources 1a, 1b can be oriented substantially perpendicular to a longitudinal axis of the vehicle). The reason is that two vehicle heights in a front-back direction of a vehicle body can be measured by the apparatus 40.

A light can be emitted from the linear light source 1a by the driver 42 and the receiver 43 can receive the image data from the first and second line cameras 2, 3. Then, a light can be emitted from the linear light source 1b by the driver 42 and the receiver 43 can receive the image data from the first and second line cameras 2, 3 in the sensor 11.

The controller 44 can detect the slant direction of the vehicle body by comparing the above-described distance B that is generated by the linear light emitted from the linear light source 1a with the other distance B that is generated by the linear light emitted from the linear light source 1b. Then, the controller 44 can output the data of the vehicular slant via an output 46. In this case, the controller 44 can receive an instruction of the measurement from the leveling device via the input 45 and can output the data of the vehicular slant to the leveling device via the output 46.

The above-described control circuits 31 and 41 can be incorporated into the sensor 10 and the sensor 11, respectively. For instance, the driver 32 can be mounted in the linear light source and the receiver 33 can be mounted in the line camera, and the controller 34 can be mounted in the base board 4. The control circuit 31 can also be mounted as one piece in the base board 4. Thus, the apparatuses 30 and 40 can be easily attached to a vehicle body along with the sensors 10 and 11, respectively.

While there has been described what are at present considered to be exemplary embodiments of the disclosed subject matter, it will be understood that various modifications may be made thereto, and it is intended that the appended claims cover such modifications as fall within the true spirit and scope of the invention. All conventional art references described above are herein incorporated in their entirety by reference.

What is claimed is:

1. A sensor for vehicle height measurement capable of measuring vehicular slant, comprising:
   a base board;
   a light source having a length direction extending parallel with a longitudinal axis of the light source, the light source being located adjacent to the base board and configured to emit a linear light about an optical axis and in a light emitting direction opposite the base board;
   a first camera having a length direction extending parallel with a longitudinal axis of the first camera, the first camera being located adjacent to the base board, and the length direction of the first camera being substantially perpendicular to the length direction of the light source;
   a second camera having a length direction extending parallel with a longitudinal axis of the second camera, the second camera being located adjacent to the base board and opposed to the first camera, and the length direction of the second camera being located substantially on a virtual extension line extending linearly from the length direction of the first camera across the light source; and
   a pair of lenses having a focus and a focal length each of the lenses located in front of a respective one of the first camera and the second camera, wherein a virtual line connecting the focuses of the pair of lenses, a virtual line connecting the focal lengths of the pair of lenses, and the virtual extension line connecting the first camera to the second camera are located substantially in parallel and on a same virtual surface, and the first camera and the second camera are configured to photograph a road image of the substantially same virtual extension surface that is generated by the linear light emitted from the light source.

2. A sensor for vehicle height measurement capable of measuring vehicular slant, comprising:
   a base board;
   a first light source having a length direction extending parallel with a longitudinal axis of the first light source, the first light source located adjacent to the base board and configured to emit a linear light along a first optical axis and in a light emitting direction opposite the base board;
   a second light source having a length direction extending parallel with a longitudinal axis of the second light source, the second light source located adjacent to the base board and the length direction of the second light source being substantially parallel with the length direction of the first light source, and the second light source being configured to emit a linear light along a second optical axis and in a second light emitting direction substantially in parallel with the light emitting direction of the first light source;
   a first camera having a length direction extending parallel with a longitudinal axis of the first camera, the first camera being located adjacent to the base board, and the length direction of the first camera being substantially perpendicular to the length direction of both the first light source and the second light source;
   a second camera having a length direction extending parallel with a longitudinal axis of the second camera, the second camera located adjacent to the base board and opposite the first camera, and the length direction of the second camera being located substantially on a virtual linear extension of the length direction of the first camera across from the length direction of both the first light source and the second light source; and
   a pair of lenses having a focus and a focal length each of the lenses located in front of a respective one of the first camera and the second camera, wherein a virtual line connecting the focuses of the pair of lenses, a virtual line connecting the focal lengths of the pair of lenses, and the virtual extension line connecting the first camera to the second camera are located substantially in parallel and on a same virtual surface, and the first camera and the second camera are configured to photograph a road image of the substantially same virtual extension surface that is generated by at least one of the linear lights emitted from the first light source and the second light source.

3. The sensor for vehicle height measurement capable of measuring vehicular slant according to claim 1, wherein the light source includes a plurality of LED chips.

4. The sensor for vehicle height measurement capable of measuring vehicular slant according to claim 2, wherein each of the first light source and the second light source includes a plurality of LED chips.

5. The sensor for vehicle height measurement capable of measuring vehicular slant according to claim 1, wherein the length direction of the light source is substantially parallel with a longitudinal axis of the vehicle.

6. The sensor for vehicle height measurement capable of measuring vehicular slant according to claim 2, wherein each of the length directions of both light sources is oriented substantially perpendicular to a longitudinal axis of the vehicle.

7. The sensor for vehicle height measurement capable of measuring vehicular slant according to claim 3, wherein the length direction of the light source is substantially parallel with a longitudinal axis of the vehicle.

8. The sensor for vehicle height measurement capable of measuring vehicular slant according to claim 4, wherein each of the length directions of both light sources is oriented substantially perpendicular to a longitudinal axis of the vehicle.

9. A vehicle height measurement apparatus using the sensor for vehicle height measurement capable of measuring vehicular slant according to claim 3, comprising:
   a driver configured to drive the light source to emit the linear light from the light source towards a road;
   a receiver configured to receive an image of the road that is generated by the light source from both the first camera and the second camera in the form of image data; and
   a controller configured to control both the driver and the receiver and configured to calculate a vehicle height in accordance with the image data output from the receiver and the focal length of the pair of lenses.

10. A vehicle height measurement apparatus using the sensor for vehicle height measurement capable of measuring vehicular slant according to claim 4, comprising:
   a driver configured to drive both light sources to emit the linear lights from the both light sources towards a road;
   a receiver configured to receive respective images of the road generated by the light sources from both the first camera and the second camera in the form of image data; and
   a controller configured to control both the driver and the receiver and configured to detect a vehicular lean in accordance with respective image data output from the receiver.

11. The vehicle height measurement apparatus according to claim 9, wherein the length direction of the light source is substantially parallel with a longitudinal axis of the vehicle.

12. The vehicle height measurement apparatus according to claim 10, wherein each of the length directions of the both light sources is oriented substantially perpendicular to a longitudinal axis of the vehicle.

13. The vehicle height measurement apparatus according to claim 9, wherein the controller is configured to operate in accordance with an instruction input, and the controller is configured to output the vehicle height via an output.

14. The vehicle height measurement apparatus according to claim 10, wherein the controller is configured to operate in accordance with an instruction input, and the controller is configured to output the vehicular lean via an output.

15. The vehicle height measurement apparatus according to claim 11, wherein the controller is configured to operate in accordance with an instruction output from a headlight system, and the controller is configured to output vehicle height data to the headlight system.

16. The vehicle height measurement apparatus according to claim 12, wherein the controller is configured to operate in accordance with an instruction output from a headlight system, and the controller is configured to output vehicular lean data to the headlight system.

17. A vehicle height measurement apparatus using a plurality of sensors for vehicle height measurement capable of measuring vehicular slant according to claim 1, comprising:
   a driver configured to drive the light sources in the plurality of sensors to emit a plurality of linear lights from the light sources towards a road;
   a receiver configured to receive image data of the road generated by a respective one of the light sources from both a corresponding first camera and a corresponding second camera in the plurality of sensors; and
   a controller configured to control both the driver and the receiver, configured to calculate respective vehicle heights in accordance with corresponding image data output from the receiver and a corresponding focal length of the pair of lenses, and configured to detect a vehicular slant between at least two vehicle heights.

18. The vehicle height measurement apparatus according to claim 17, wherein each of the light sources includes a plurality of LED chips.

19. The vehicle height measurement apparatus according to claim 18, wherein each of the length directions of the light sources is substantially parallel with a longitudinal axis of the vehicle.

20. The vehicle height measurement apparatus according to claim 19, wherein the controller is configured to operate in accordance with an instruction output from a headlight system, and the controller is configured to output vehicular slant data to the headlight system.

* * * * *